(12) United States Patent
Su et al.

(10) Patent No.: US 6,772,360 B2
(45) Date of Patent: Aug. 3, 2004

(54) EXTENSION SIGNAL GENERATOR COUPLED TO AN EXTENSION TIMER AND AN EXTENSION REGISTER TO GENERATE AN INITIALIZATION EXTENSION SIGNAL

(75) Inventors: Sam Su, Irvine, CA (US); Hossein Hashemi, Mission Viejo, CA (US); Qing Xue, Irvine, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 694 days.

(21) Appl. No.: 09/779,195

(22) Filed: Feb. 7, 2001

(65) Prior Publication Data

US 2002/0108032 A1 Aug. 8, 2002

(51) Int. Cl.[7] .......................... G06F 1/04; G06F 15/177; H03L 7/00
(52) U.S. Cl. ............................. 713/500; 713/1; 327/161
(58) Field of Search ....................... 713/1, 500; 327/161

(56) References Cited

U.S. PATENT DOCUMENTS

| | | | |
|---|---|---|---|
| 4,860,196 A | * | 8/1989 | Wengert ........................ 713/1 |
| 5,467,039 A | | 11/1995 | Bae |
| 5,586,327 A | | 12/1996 | Bealkowski et al. |
| 5,737,524 A | | 4/1998 | Cohen et al. |
| 6,073,156 A | * | 6/2000 | Purcell et al. ............... 708/629 |
| 6,160,428 A | | 12/2000 | Pasqualini |
| 6,160,433 A | * | 12/2000 | Yamazaki .................... 327/159 |
| 6,226,729 B1 | * | 5/2001 | Stevens et al. .............. 711/171 |
| 6,289,436 B1 | * | 9/2001 | Terashima .................... 712/36 |
| 6,362,669 B1 | | 3/2002 | Zhou et al. |

* cited by examiner

Primary Examiner—Thomas Lee
Assistant Examiner—Chun Cao
(74) Attorney, Agent, or Firm—Morrison & Foerster LLP

(57) ABSTRACT

In an embodiment, an initialization extension device may provide an extended initialization period to enable a processor to configure a device, for example, an application specific integrated circuit (ASIC), prior to entering an operating mode. The device may include a number of control registers that may be configured to default settings in a register initialization period commenced in response to a reset signal. The reset signal may also trigger an extension timer to countdown a timer extended initialization period. During the timer extended initialization period, the processor may write an extension control signal, e.g., an extension bit, to a register. An initialization extension unit may maintain the device in an initialization mode during the timer extended initialization period and/or while the register contains the extension control signal. The processor may configure the control registers for one or more operations the device may perform when it enters the operating mode.

7 Claims, 3 Drawing Sheets

EXTENSION SIGNAL GENERATOR COUPLED TO AN EXTENSION TIMER AND AN EXTENSION REGISTER TO GENERATE AN INITIALIZATION EXTENSION SIGNAL

TECHNICAL FIELD

This invention relates to hardware initialization, and more particularly to enabling an extended hardware initialization.

BACKGROUND

The operation of an Application Specific Integrated Circuit (ASIC) may be controlled by data stored in control registers in the ASIC. When the ASIC is powered on, a reset signal may be transmitted to the ASIC. This reset signal may trigger a register initialization in which the contents of the control registers may be set to default values. Upon completion of the register initialization, the ASIC may enter an operating mode.

The default values in the control registers may not be appropriate for one or more operations the ASIC may perform in the operating mode. A processor may perform read and write operations to the control registers to configure the control registers for the operating mode. Depending on the number of control registers, the configuration may take several seconds. However, the processor may not have read or write access to the control registers during the register initialization. When the ASIC enters the operating mode, certain control registers may still contain default values that may not be appropriate for the operation the ASIC is performing. Thus, the ASIC may begin operating before it is appropriately configured for the operating mode. This may result in a "gray" operating period in which the performance of the ASIC may be unpredictable.

SUMMARY

According to an embodiment, an initialization extension device may provide an extended initialization period to enable a processor to configure a device, for example, an application specific integrated circuit (ASIC), prior to entering an operating mode. The device may include a number of control registers that may be configured to default settings in a register initialization period commenced in response to a reset signal. The reset signal may also trigger an extension timer to countdown a timer extended initialization period. During the timer extended initialization period, the processor may write an extension control signal, e.g., an extension bit, to a register. An initialization extension unit may maintain the device in an initialization mode during the timer extended initialization period and/or while the register contains the extension control signal. The processor may configure the control registers for one or more operations the device may perform when it enters the operating mode.

The details of one or more embodiments are set forth in the accompanying drawings and the description below. Other features, objects, and advantages of various embodiments will be apparent from the description and drawings, and from the claims.

DETAILED DESCRIPTION

Figure 1:
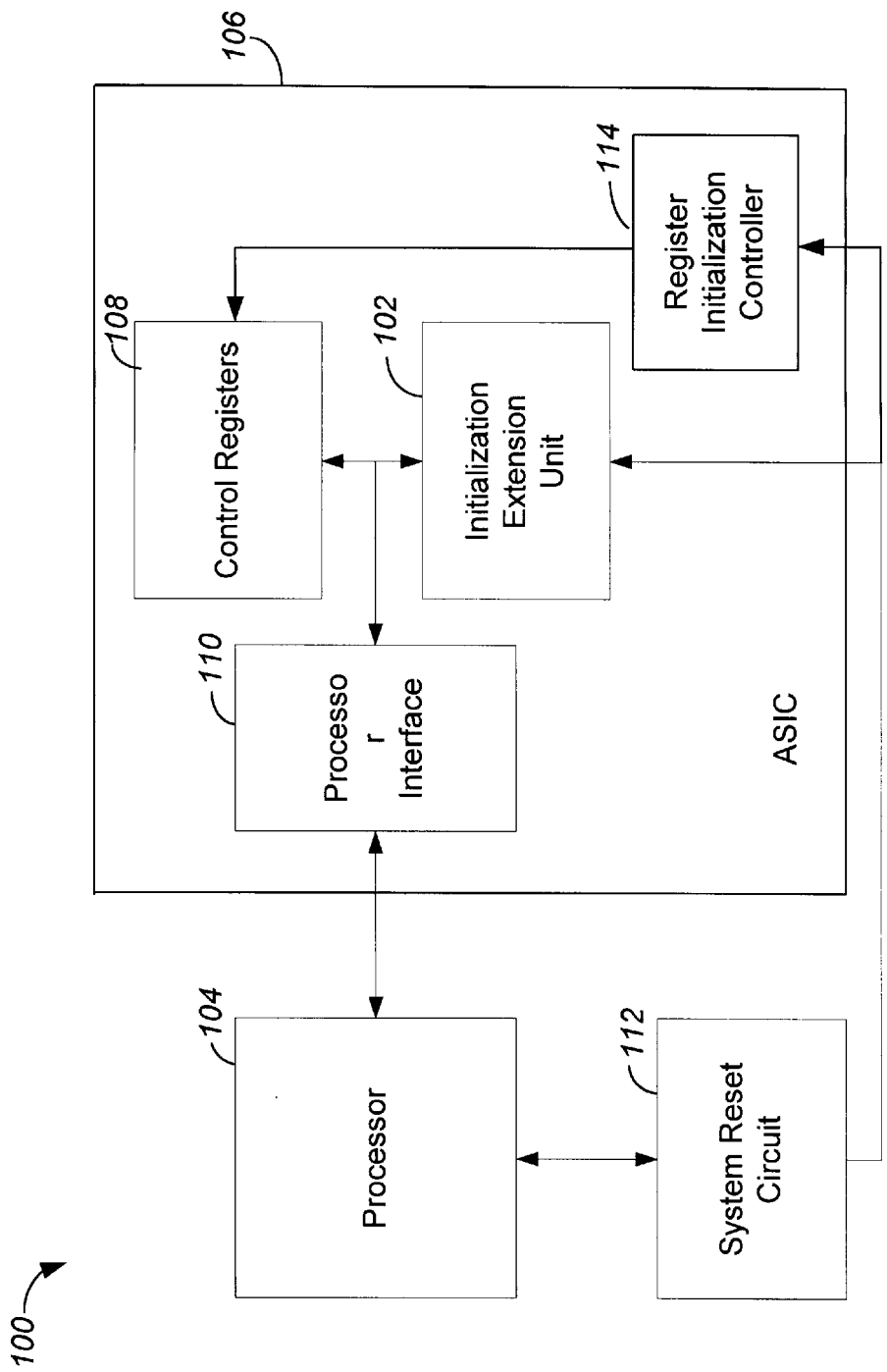
FIG. 1 is a block diagram of a system including an initialization extension unit according to an embodiment.

FIG. 1 illustrates a system 100 including an initialization extension unit 102 which may enable a processor 104 to extend an initialization period in an Application Specific Integrated Circuit (ASIC) 106. The processor 104 may extend the initialization period until the processor has configured the ASIC control registers 108 for the operation(s) the ASIC may perform an operating mode. Thus, the ASIC 106 may enter the operating mode appropriately configured, thereby decreasing the likelihood of the ASIC 106 performing unpredictably after a power on reset.

The ASIC 106 may include the initialization extension unit 102, control registers 108, and a processor interface 110. Data in the control registers 108 may be used to control operation of the ASIC 106. The processor 104 may access ASIC resources, including the control registers 108, via the processor interface 110.

A system reset circuit 112 may generate a reset signal when the ASIC is powered on. The reset signal may trigger a register initialization controller 114 to set the contents of the control registers 108 to default values. During register initialization, the processor 104 may be unable to read or write data to the control registers 108.

Figure 2:
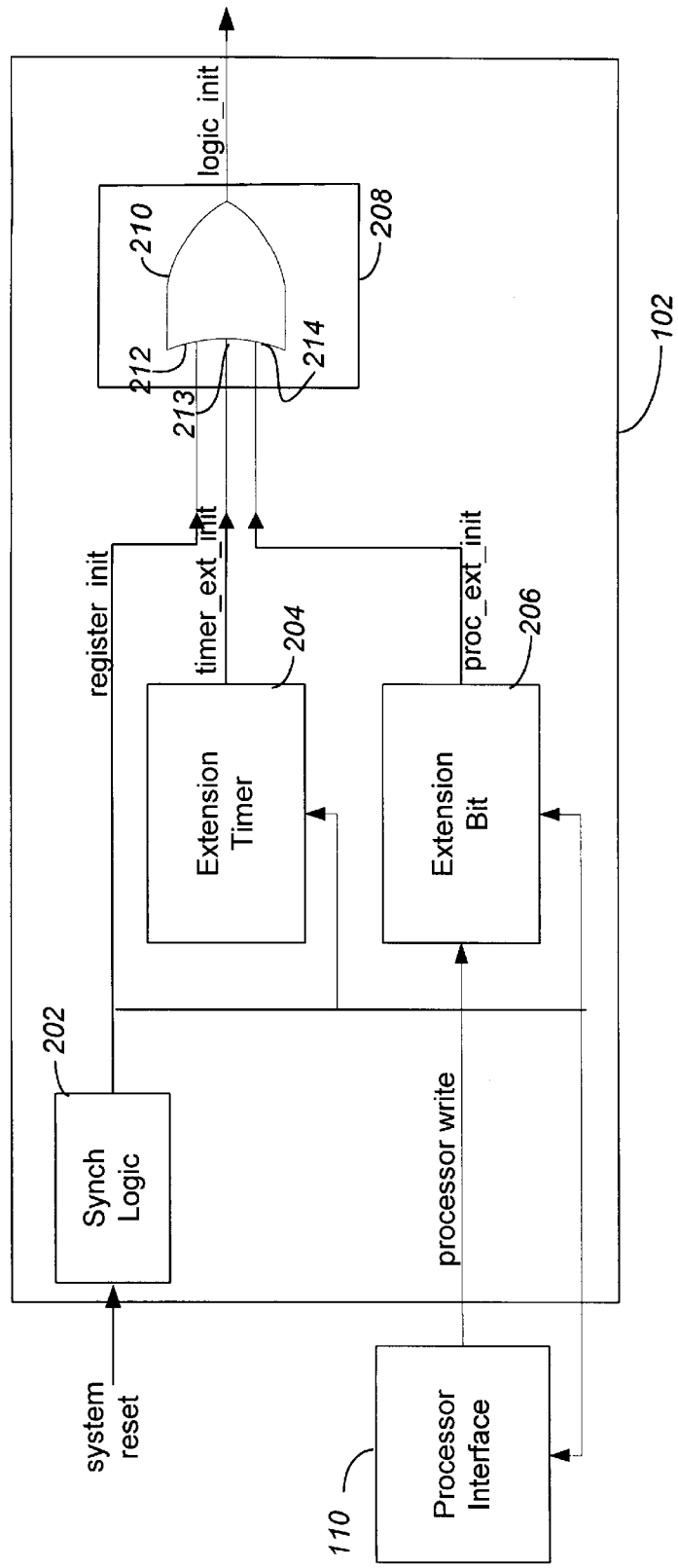
FIG. 2 is a block diagram of the initialization extension unit of FIG. 1.

The reset signal may also be transmitted to the initialization extension unit 102. FIG. 2 illustrates components of the initialization extension unit 102 according to an embodiment. The initialization extension unit 102 may include a synchronization (synch) logic unit 202, an extension timer 204, an extension bit register 206, and an extension signal generator 208.

Figure 3A:
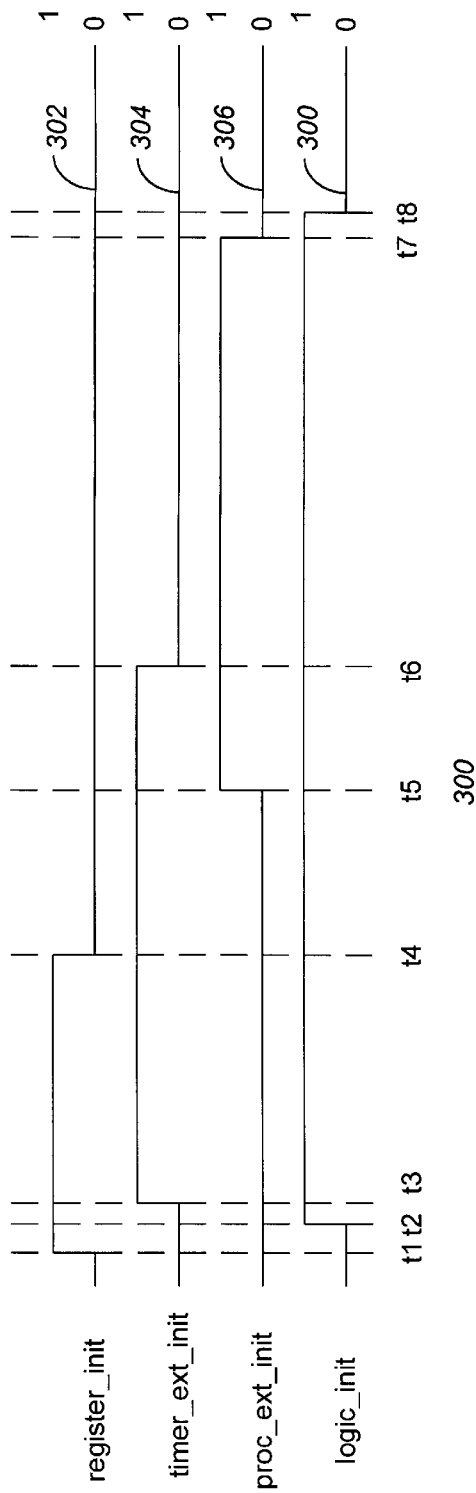
FIGS. 3A and 3B are timing diagrams illustrating exemplary extended initialization periods utilizing the initialization extension unit of FIG. 1.

The extension signal generator 208 may output a logic initialization signal (logic_init) 300 (FIG. 3A). While this signal is HIGH, the initialization extension unit 102 may maintain the ASIC in an initialization mode and delay the ASIC from entering the operating mode. The extension signal generator may be an OR gate 210 with three inputs 212–213 that may receive signals from the synch logic unit 202, the extension timer 204, and the extension bit register 206, respectively.

The synch logic unit 202 may be coupled to the system reset circuit 112 (FIG. 1). While the register initialization is being performed, the synch logic unit 202 may output a register initialization signal (reg_init) 302 (FIG. 3A) to the OR gate 210, setting the input 212 to a HIGH value for the duration of the register initialization. This drives the logic initialization signal output from the OR gate 210 to a HIGH value.

The synch logic unit 202 may also transmit the register initialization signal to each of the extension timer 204, the extension bit register 206, and the processor 104 via the processor interface 110.

In response to the HIGH register initialization signal, the extension timer 204 may begin to countdown a timer extended initialization period. The timer extended initialization period may have a longer duration than the register initialization period. The extension timer 204 may transmit a timer extended initialization signal (timer_ext_init) 304 (FIG. 3A) to the OR gate 210, setting an input 213 to a HIGH value for the duration of the timer extended initialization period. This may drive the output of the OR gate 210 to a HIGH value, causing the initialization extension unit 102 to maintain the ASIC 106 in the initialization mode, and thereby delay the ASIC 106 from entering the operating mode.

As described above, the register initialization signal 302 may be transmitted to the processor at power on reset. The processor 104 may optionally extend the initialization period beyond the timer extended initialization period provided by the extension timer 204. If the default values written to the control registers 108 during the register initialization are appropriate for the ASIC operation, the processor 104 may allow the timer extended initialization period to expire, at which time the ASIC 106 may enter the operating mode. Alternatively, the processor 104 may extend the initialization period by writing an extension bit, having a HIGH value, to the extension bit register 206 in an interval between the end of the register initialization period and the end of the timer extended initialization period. The extension bit register 206 may output a processor extended initialization signal (proc_ext_init) 306 (FIG. 3A) to the OR gate 210, setting the input 214 to a HIGH value while the extension bit register 206 contains the extension bit. This may drive the output of the OR gate 210 to a HIGH value, causing the initialization extension unit 102 to maintain the ASIC in the initialization mode, and thereby delay the ASIC 106 from entering the operating mode. During this extended initialization period, the processor 104 may have read and write access to the control registers 108. The processor 104 may maintain the ASIC in the initialization mode until it has configured the control registers 108 for the operation(s) the ASIC may perform when it enters the operating mode. Once the control registers have been configured, the processor 104 may write an extension termination bit, having a LOW value, to the extension bit register 206, thereby ending the initialization period, and transitioning the ASIC 106 into the operating mode. Thus, according to an embodiment, the ASIC 106 may enter the operating mode appropriately configured.

FIG. 3A is a timing diagram that illustrates the signals input to and output from the OR gate 210 for an ASIC power on reset in which the processor 104 extends the initialization period. The system reset circuit 112 (FIG. 1) may transmit a system reset signal to the synch logic unit 202 (FIG. 2), causing that unit 202 to output a HIGH register initialization signal 302 to the extension timer 204, the processor interface 110, and the input 212 of the OR gate 210 at a time $t_1$. The register initialization signal 302 may set the input 212 to a HIGH value and drive the logic initialization signal 300 output from the OR gate 210 to a HIGH value at time $t_2$. The HIGH register initialization signal 302 may trigger the extension timer 204 to countdown the timer extended initialization period, and output a HIGH timer extended initialization signal 304 to the input 213 of the OR gate 210 at a time $t_3$.

When the register initialization period expires, the register initialization signal may drop to a LOW value at a time $t_4$, while the timer extended initialization signal 304, and consequently, the logic initialization signal 300 remain HIGH. At a time $t_5$, the processor 104 may write an extension bit, having a HIGH value, to the extension bit register 206, causing the register 206 to output a HIGH processor extended initialization signal 306. When the extension timer extended initialization period expires, the timer extended initialization signal 304 may drop to a LOW value at a time $t_6$. However, the processor extended initialization signal 306, and hence the logic initialization signal 300, may remain HIGH. The processor 104 may then configure the control registers 108, preparing the ASIC 106 to enter the operating mode appropriately configured. Once the processor 104 has configured the control registers 108, it may write an extension termination bit, having a LOW value, to the extension bit register 206 at a time $t_7$. With all three inputs 212–214 at LOW values, the logic initialization signal 300 output from the OR gate may drop to a LOW value at a time $t_8$. The ASIC 106 may then exit the initialization mode and enter the operating mode.

Figure 3B:
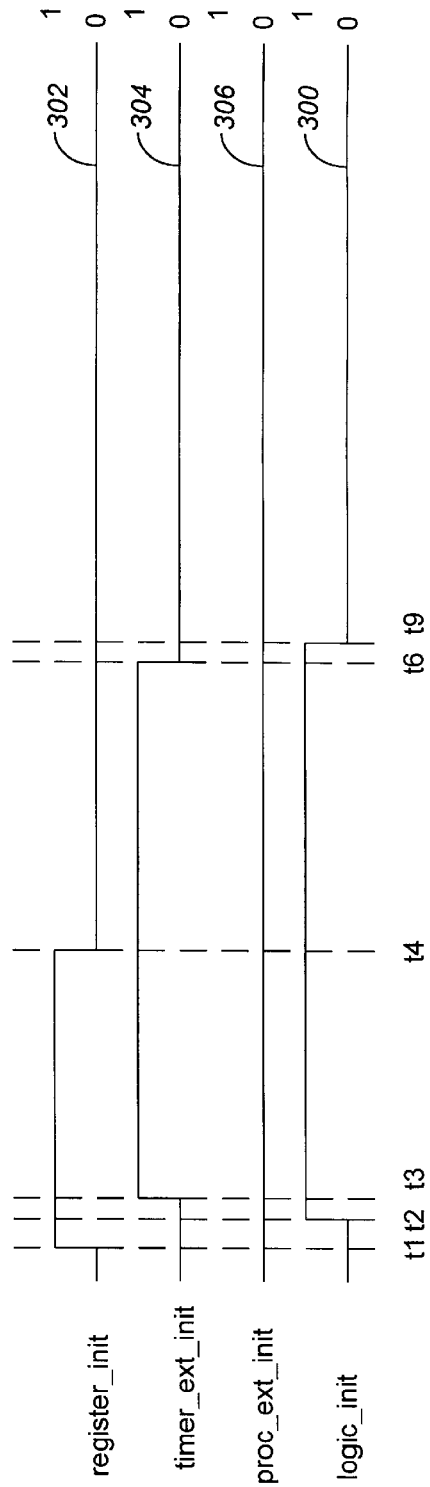

FIG. 3B is a timing diagram that illustrates the signals input to and output from the OR gate 210 for an ASIC power on reset in which the processor 104 does not extend the initialization period beyond the extension provided by the extension timer 204. In this case, the processor 104 may not write an extension bit to the extension bit register 206. For example, the default values written to the control registers 108 during the register initialization may be appropriate for the operation(s) the ASIC 106 may perform in the operating mode. When the timer extended initialization period expires at time $t_6$, inputs 212–214 of the OR gate are all at LOW values, causing the output logic initialization signal 300 to drop to a LOW value at time $t_9$, resulting in the ASIC 106 entering the operating mode.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus comprising:
    an extension timer operative to countdown a timer extended initialization period and output a first extension signal during said timer extended initialization period;
    an extension register operative to output a second extension signal in response to an extension control signal; and
    an extension signal generator coupled to each of the extension timer and the extension register, said extension signal generator operative to generate an initialization extension signal in response to receiving at least one of the first extension signal and the second extension signal.

2. The apparatus of claim 1, wherein the extension signal generator comprises an OR gate.

3. The apparatus of claim 1, further comprising an initialization controller coupled to the extension signal generator, said initialization controller operative to maintain a device in an initialization mode in response to the initialization extension signal.

4. The apparatus of claim 3, wherein the device comprises an application specific integrated circuit (ASIC).

5. The apparatus of claim 1, further comprising a plurality of control registers.

6. The apparatus of claim 5, further comprising:
    a processor coupled to the extension register and the plurality of control registers, said processor operative to transmit the extension control signal to the extension register while configuring said plurality of control registers, and further operative to configure the plurality of control registers for an operating mode.

7. The apparatus of claim 5, further comprising:
    a default initialization controller operative to configure the plurality of control registers to a plurality of default values during a register initialization period; and
    a signal generator to transmit an initialization signal to the extension signal generator during the register initialization period,
    wherein the extension signal generator is further operative to generate the initialization extension signal in response to at least one of the initialization signal and the first and second extension signals.

* * * * *